J. A. GILES.
TOOL HOLDER.
APPLICATION FILED NOV. 16, 1918.
1,324,809.
Patented Dec. 16, 1919.
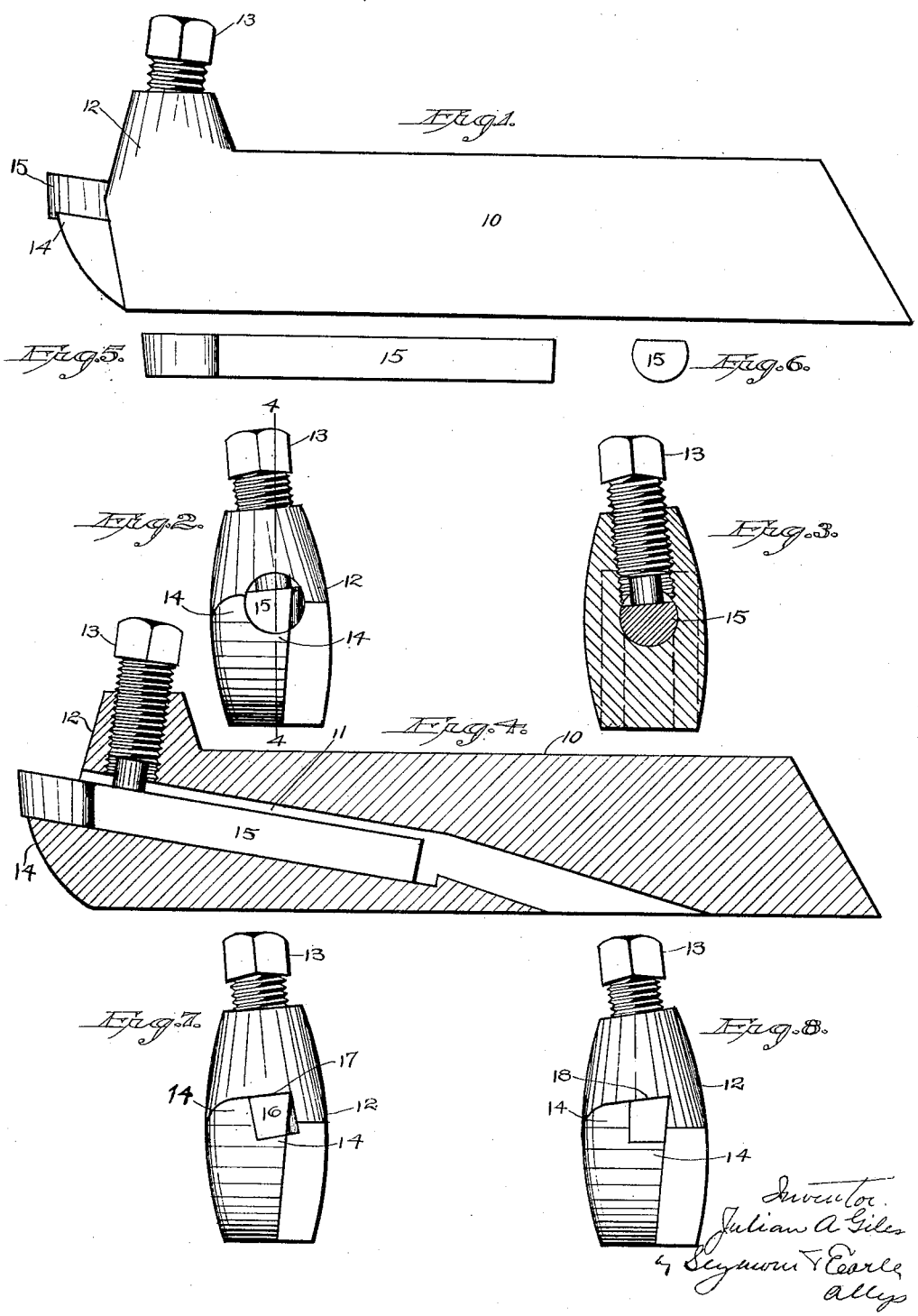

UNITED STATES PATENT OFFICE.

JULIAN A. GILES, OF DERBY, CONNECTICUT, ASSIGNOR TO THE ACME TOOL AND MACHINE CO., OF DERBY, CONNECTICUT, A CORPORATION.

TOOL-HOLDER.

1,324,809. Specification of Letters Patent. Patented Dec. 16, 1919.

Application filed November 16, 1918. Serial No. 262,837.

*To all whom it may concern:*

Be it known that I, JULIAN A. GILES, a citizen of the United States, residing at Derby, in the county of New Haven and State of Connecticut, have invented a new and useful Improvement in Tool-Holders; and I do hereby declare the following, when taken in connection with the accompanying drawings and the characters of reference marked thereon, to be a full, clear, and exact description of the same, and which said drawings constitute part of this application, and represent, in—

Figure 1 a side view of a tool-holder constructed in accordance with my invention.

Fig. 2 a front view of the same.

Fig. 3 a vertical sectional view of the cutter.

Fig. 4 a sectional view on the line 4—4 of Fig. 2.

Fig. 5 a side view of the cutter, detached.

Fig. 6 an end view of the same.

Fig. 7 a front view of a tool-holder provided with a square cutter.

Fig. 8 a similar view showing a tool adapted to receive an irregularly shaped cutter.

This invention relates to an improvement in tool holders such as are commonly used in lathes, planers and shapers for cutting metal, the object of the invention being to provide a tool-holder in which the tool is held at the desired angle and is fully supported against the thrust imposed upon it against the work; and the invention consists in the construction hereinafter described and particularly recited in the claims.

In carrying out my invention, I employ a tool-holder 10 adapted in the usual manner to be fitted in a lathe, shaper or trimmer. This holder is formed with a clearance opening 11 for the tool which is preferably round and inclines at an angle of about 8° from the longitudinal axis of the holder. Preferably and as shown, the head 12 is made thicker than the body of the holder so as to form a firm support for the tool and a firm support for a set screw 13 which is arranged at an angle to the vertical axis of the tool-holder. The outer end of the holder is formed with a tool-supporting lug 14 differing from supporting lugs heretofore provided, in that it not only supports the lower face of the tool but projects upward behind the tool so as to form a support for the cutting edge of the tool. If a round hole is formed for the tool, I will preferably use a tool 15 round on its under face to correspond to the hole and flattened on its upper face against which the screw 13 bears, and so that this cutting face will be held at an angle to the plane of the cutter, this angle being preferably about 14°. By forming the cutter from round stock and flattening it at its upper face the cutter is readily formed and is firmly held against turning by the screw and the upper cutting edge is not ground but the tool is sharpened by cutting away the side wall of the tool.

Instead of forming the tool from round stock, it may be formed from square stock as shown in Fig. 7 of the drawings, in which a square cutter 16 fits a square hole 17, but in this case as first described, a hole for the cutter is formed so that the upper face of the cutter or rake is inclined to the desired angle, or instead of forming the cutter from square stock, it may be formed from irregularly formed stock especially made for that purpose, as shown in Fig. 8 of the drawings. In this case, however, the upper face 18 will have the desired rake, and the screw 13 will be inclined at the desired angle to firmly bear upon the upper face of the cutter. Whatever the shape of the cutter may be, the tool-supporting lug 14, not only supports the under face of the projecting portion of the tool, but also extends upward against the side opposite the cutting edge so as to not only give the cutter a perfect support at its extreme end, but by thus surrounding the outer end of the cutter it greatly assists in carrying away the heat.

It will be understood that these tools may be made right or left as is required. By arranging the set screw at an angle and arranging the upper face of the cutter at an angle, the proper angle is given and does not require special grinding by the workman who uses them. The particular angle required for any cutting having been determined, it is only necessary to use the proper tool-holder, and the angle of the upper face of the cutter is always correct,—something which is difficult to attain when the workman has to grind the upper face of the cutter for the purpose.

I claim:

1. The combination with a tool-holder having a tool-receiving opening inclined therein from front to rear, of a tool located in the said opening in which it is inclined with respect to the horizontal and positioned therein so that its flat upper face is inclined with respect to the central, longitudinal vertical plane of the holder as well as with respect to the horizontal, and a set-screw mounted in the holder and correspondingly inclined therein to the horizontal and said vertical plane of the holder in conformity with the inclination of the flat upper face of the tool when positioned therein as described.

2. The combination with a tool-holder having a tool-receiving opening inclined therein from front to rear, of a tool located in the said opening in which it is inclined with respect to the horizontal and positioned therein so that its flat upper face is inclined with respect to the horizontal, and a set-screw mounted in the holder and correspondingly inclined therein to the horizontal and the central longitudinal vertical plane of the holder in conformity with the inclination of the flat upper face of the tool when positioned therein as described, said holder formed at its outer end with an integral supporting lug extending beneath the lower face of the opening and upward beyond one side thereof.

In testimony whereof, I have signed this specification in the presence of two subscribing witnesses.

JULIAN A. GILES.

Witnesses:
H. E. JENKINS,
C. H. CROPPER.